Dec. 27, 1949     L. O. SPAULDING     2,492,199
CENTER OF GRAVITY DEVICE
Filed March 15, 1946
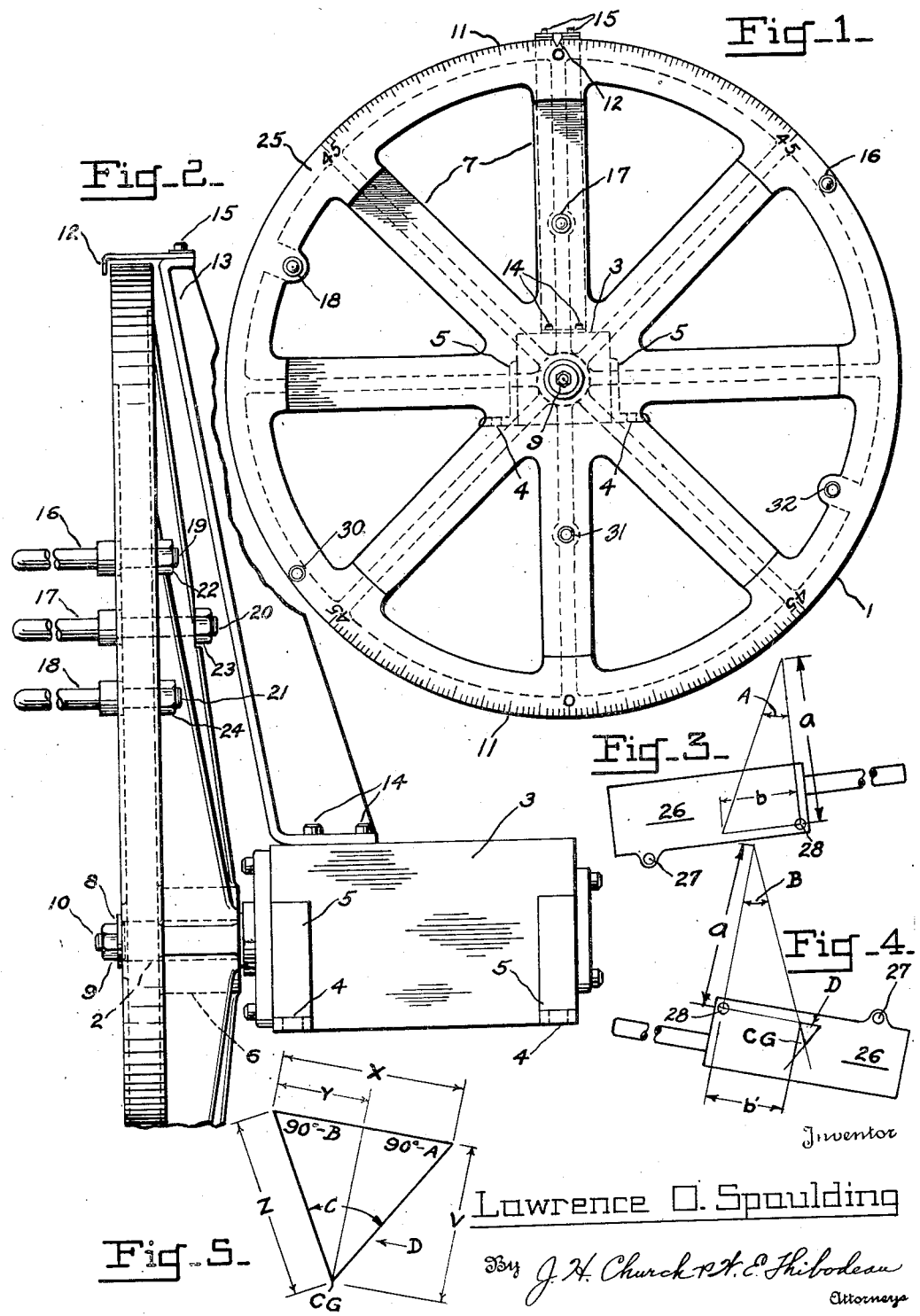
Inventor
Lawrence O. Spaulding
By J. H. Church & A. E. Thibodeau
Attorneys Patented Dec. 27, 1949

2,492,199

UNITED STATES PATENT OFFICE 2,492,199

CENTER OF GRAVITY DEVICE

Lawrence O. Spaulding, Longmeadow, Mass.

Application March 15, 1946, Serial No. 654,789

3 Claims. (Cl. 73—65)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a device for determining the center of gravity of an object.

Accurate determination of the center of gravity of irregularly shaped objects has been accomplished only with difficulty by known methods. In the first place, such objects are somewhat difficult to support while attempting to determine the center of gravity thereof and, secondly, even when such objects are properly supported, determination of the center of gravity thereof is not always precise. One procedure for graphically determining the center of gravity of an irregularly shaped object is to suspend such object in a number of different positions and from each point of suspension drop a plumb line. The intersection of such plumb lines is intended to determine the center of gravity of the object. It is obvious, however, that such determination is cumbersome and somewhat inaccurate.

Accordingly, it is an object of this invention to provide a device for accurately determining the center of gravity of any object adapted for mounting on such device.

A particular object of this invention is to provide a device for determining the center of gravity of a U. S. Browning type machine gun.

The specific nature of the invention as well as other objects and advantages thereof will clearly appear from a description of a preferred embodiment as shown in the accompanying drawing in which:

Fig. 1 is a front view of the assembly;

Fig. 2 is a partial side view of the assembly of the center of gravity machine;

Fig. 3 is a diagrammatic sketch of the right side up mounting of a gun, and the angle derived thereby;

Fig. 4 is a diagrammatic sketch of the upside down mounting of a gun, and the angle derived thereby; and Fig. 5 is an enlarged view at D in Fig. 4.

In Fig. 1 there is shown in assembled relation, a center of gravity device embodying this invention. Such device comprises essentially a large diameter wheel 1 mounted on a horizontal shaft 2 by means of a nut 9 and washer 8, the nut 9 being threadably secured to the end portion 10 of the shaft 2. A housing 3 provided with fixed bearings (not shown) supports shaft 2 in such manner that free rotation of the shaft is thereby obtained. The entire assembly is arranged to be secured to a table or other means of support by bolts which are inserted through suitable holes 4 provided in outwardly extending flanges 5 depending from the lower edges of housing 3.

According to the preferred form of this invention, the wheel 1 is provided with a centrally disposed hub 6 as shown in Fig. 2 from which extend a plurality of radially disposed spokes 7 connecting such hub with a rim 25. The face of such rim near the outer periphery thereof is graduated in degrees as shown at 11. A bracket 13, secured to the housing 3 by screws 14 as shown in Fig. 2, is provided to mount a horizontally disposed index pointer 12 on the vertical axis of wheel 1. Screws 15 secure such pointer to bracket 13.

It is desired to point out that the wheel 1 can be fabricated as a single disk. Obviously, whatever construction is desired, the wheel must be balanced to a high degree of sensitivity in order to obtain the advantages of this invention.

Three horizontally disposed mounting pins 16, 17, and 18 extending substantially at right angles from wheel 1 are secured thereon by nuts 22, 23, and 24 screwed onto the rear end threaded portions 19, 20, and 21 of the mounting pins 16, 17, and 18. Pin 17 is mounted on the spoke 7 which is disposed opposite the zero position of the graduations 11 inscribed on rim 25. Pins 16 and 18 are mounted on rim 25 to the right and left respectively of pin 17.

The device herein described is preferably utilized to determine the center of gravity of a U. S. Browning type machine gun. Accordingly, in the following description of the method of determining the center of gravity of an object, such gun is utilized as an example. However, this is only a specific illustration and should not be construed as limiting this invention solely to such use.

For such firearm it has been found that two readings yield sufficient data for the solving of certain mathematical formulas, as will later be shown herein. The methods of mounting the Browning type machine gun 26 are shown in Figs. 3 and 4. The holes 27 and 28 used for engaging the mounting pins 16, 17, and 18 are those normally utilized to mount the gun 26 on a tripod or other support. In the event it is desired to use that portion of scale 11 which appears on the bottom half of wheel 1, there are provided alternate pins 30, 31 and 32 which may be used to determine the center of gravity of an object in a manner similar to that about to be explained for pins 16, 17 and 18.

The first reading necessary to determine the center of gravity of gun 26 is obtained by mounting said gun right-side up on wheel 1 as shown in Fig. 3, mounting pin 17 engaging hole 28 and mounting pin 18 engaging hole 27. Wheel 1 is then permitted to rotate due to the weight of gun 26 until the wheel 1 comes to a state of rest with the gun 26 assuming substantially the position as shown in Fig. 3. In such position, the angle A shown therein can be read directly from the graduated scale 11 of wheel 1. Such angle is conveniently determined inasmuch as pin 17 is located on the spoke 7 which has the "0" graduation mark at the top thereof and when the wheel 1 is in its non-working position, the "0" mark is directly under the pointer 12. Thus when the gun 26 mounted on wheel 1 comes to rest, angle A can be read directly opposite the pointer 12 and is the amount of rotation from the vertical axis in degrees. If a perpendicular is dropped to the longitudinal axis of the gun from the "0" mark to trunnion hole 28, angle A can be laid off from the "0" mark and the side thereof inscribed on the gun.

For the second reading the gun is removed from the mounting pins and then mounted upside down on wheel 1 as shown in Fig. 4. Pin 16 engages hole 27 while pin 17 re-engages hole 28. The wheel is then permitted to rotate until it comes to a state of rest and the angle B may be read directly on the graduated scale 11 in a manner similar to that described for the first reading. If angle B is laid off in the same manner as that described for angle A, the intersection on the gun of the sides of the angles will indicate the center of gravity.

On the other hand, by substituting the values of the angles thus found in the formulas shown below, measurements locating the center of gravity of gun 26 are readily determined.

$a$ is constant

Angle A and B as determined from device (A is always larger)

$b = a \tan A$
$b' = a \tan B$
$x = a \tan A - a \tan B$
Angle $C = 180° - ((90° - A) + (90° - B))$ $$z = \frac{x(\sin 90° - A)}{\sin C}$$

$y = z \cdot \cos(90° - B)$
$v = z \cdot \sin(90° - B)$
$b' + y$ = horizontal distance from adapter hole
$v$ = vertical distance from adapter hole When the values of $b' + y$ and $v$ have been determined such distances can be readily laid out on gun 26 from hole 28 and thereby locate the desired center of gravity as shown at CG in Fig. 4.

Thus it is readily apparent that there is here provided a device whereby the center of gravity of any object capable of being mounted hereon can be conveniently and accurately determined.

I claim:

1. A device for determining the center of gravity of any object arranged for mounting thereon and having mounting holes therefor, comprising a balanced wheel arranged to rotate freely, there being a series of graduation marks including a zero mark inscribed on the rim of said wheel, indexing means fixedly secured to a non-rotating portion of the device and arranged to indicate the amount of angular displacement thereof from a zero position, and a plurality of mounting pins removably secured to said wheel and arranged to maintain the balance of said wheel, one of said pins being secured to said wheel a fixed radial distance from said zero mark, the remaining pins secured to said wheel on both sides of said radially fixed pin at distances therefrom corresponding to the linear distance between the particular mounting hole in the object selected to receive said radially fixed pin and each of said remaining holes whereby at least two successive and different mountings of the object on said mounting pins effect corresponding angular displacements of said wheel from which trigonometric relations can be set up for evaluation of distances which when measured from the aforementioned particular mounting hole serve to determine the center of gravity of the object.

2. A device for determining the center of gravity of any object arranged for mounting thereon and having mounting holes therefor, comprising a balanced wheel rotatably mounted on a horizontal shaft, said wheel having a hub and a plurality of spokes radiating therefrom, there being a series of graduation marks inscribed on the rim of said wheel, said graduation marks including a centrally located zero mark, an index pointer fixedly secured to a non-rotating portion of the device and arranged to align with said zero mark when said wheel is in a non-operative position, and a plurality of mounting pins removably secured to said wheel and arranged to maintain the balance of said wheel, one of said pins being secured to one of said spokes in radial alignment with said zero mark and at a fixed distance therefrom, the remaining pins being secured to said wheel on both sides of said radially fixed pin at distances therefrom corresponding to the linear distances between the particular mounting hole in the object selected to receive said radially fixed pin and each of said remaining holes whereby at least two successive and different mountings of the object effect corresponding angular displacements of said wheel from which trigonometric relations can be set up for evaluation of distances which when measured from the aforementioned particular mounting hole along the longitudinal and vertical axes of the object serve to determine the center of gravity of the object.

3. A device for determining the center of gravity of a gun having a front and rear mounting hole, comprising a housing, a horizontally disposed shaft rotatably secured in said housing and having one end extending therefrom, a balanced wheel fixedly mounted to said free end of said horizontal shaft, said wheel having a hub and a plurality of spokes radiating therefrom, there being a series of graduation marks inscribed on the rim of said wheel, said graduation marks including a centrally located zero mark, an index pointer fixedly secured to said housing and arranged to align with said zero mark when said wheel is in a non-operative position, and a plurality of mounting pins removably secured to said wheel and arranged to maintain the balance of said wheel, one of said pins being secured to one of said spokes in radial alignment with said zero mark and at a fixed distance therefrom, the remaining pins being secured to said wheel on both sides of said radially fixed pin at distances therefrom corresponding to the linear distance between the gun mounting holes whereby mounting the gun on said pins in at least two reversed positions effects corresponding angular displacements of said zero mark from said index pointer, the values of said angular displacements arranged for substitution in trigonometric formulas to indicate distances which when measured along the horizontal and vertical axes of the front mounting hole establish a point determining the center of gravity of the gun.

LAWRENCE O. SPAULDING.

No references cited.